US011942605B2

(12) United States Patent
Chikagawa et al.

(10) Patent No.: US 11,942,605 B2
(45) Date of Patent: Mar. 26, 2024

(54) SOLID-STATE BATTERY

(71) Applicant: Murata Manufacturing Co., Ltd., Nagaokakyo (JP)

(72) Inventors: Osamu Chikagawa, Nagaokakyo (JP); Ryohei Takano, Nagaokakyo (JP); Kenichi Bando, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 595 days.

(21) Appl. No.: 17/206,791

(22) Filed: Mar. 19, 2021

(65) Prior Publication Data

US 2021/0210790 A1 Jul. 8, 2021

Related U.S. Application Data

(63) Continuation of application No. PCT/JP2019/032426, filed on Aug. 20, 2019.

(30) Foreign Application Priority Data

Oct. 2, 2018 (JP) .................................. 2018-187668

(51) Int. Cl.
*H01M 10/0585* (2010.01)
*H01M 10/0525* (2010.01)
(Continued)

(52) U.S. Cl.
CPC ... *H01M 10/0585* (2013.01); *H01M 10/0525* (2013.01); *H01M 50/548* (2021.01); *H01M 50/552* (2021.01); *H01M 50/562* (2021.01)

(58) Field of Classification Search
CPC ......... H01M 10/0585; H01M 10/0525; H01M 50/548; H01M 50/552; H01M 50/562;
(Continued)

(56) References Cited

U.S. PATENT DOCUMENTS 6,451,474 B1 9/2002 Kozu et al.
10,128,535 B2 * 11/2018 Ihara ................. H01M 10/0566
(Continued)

FOREIGN PATENT DOCUMENTS

JP 2000149892 A 5/2000
JP 2007080812 A 3/2007
(Continued)

OTHER PUBLICATIONS

International Search Report issued for PCT/JP2019/032426, dated Nov. 26, 2019.
(Continued)

*Primary Examiner* — Abdullah A Riyami
*Assistant Examiner* — Nader J Alhawamdeh
(74) *Attorney, Agent, or Firm* — ArentFox Schiff LLP

(57) ABSTRACT

A solid-state battery including a solid-state battery laminate that includes at least one battery constituent unit including a positive electrode layer, a negative electrode layer, and a solid electrolyte layer interposed between the positive electrode layer and the negative electrode layer along a lamination direction, and defining: an overlapping part in which the positive electrode layer and the negative electrode layer overlap each other in the lamination direction, and a non-overlapping part in which the positive electrode layer and the negative electrode layer do not overlap each other in the lamination direction. At least one main surface having a normal in the lamination direction has a recess overlapping the overlapping part and defines a step between the overlapping part and the non-overlapping part or in the non-overlapping part.

14 Claims, 7 Drawing Sheets

(51) Int. Cl.
*H01M 50/548* (2021.01)
*H01M 50/552* (2021.01)
*H01M 50/562* (2021.01)

(58) Field of Classification Search
CPC .. H01M 6/40; H01M 50/133; H01M 10/0562; H01G 2/065; H01G 11/06; H01G 11/26; H01G 11/50; H01G 11/56; H01G 11/76; Y02E 60/10; Y02P 70/50
See application file for complete search history.

(56) References Cited

U.S. PATENT DOCUMENTS

| | | | |
|---|---|---|---|
| 2019/0140261 A1* | 5/2019 | Yamamoto | H01M 4/587 |
| 2019/0288246 A1* | 9/2019 | Kato | H01M 50/548 |
| 2019/0334205 A1* | 10/2019 | Waseda | H01M 4/134 |
| 2020/0303781 A1 | 9/2020 | Baba | |
| 2021/0210790 A1* | 7/2021 | Chikagawa | H01G 11/26 |
| 2022/0393265 A1* | 12/2022 | Akiyama | H01M 10/0585 |
| 2023/0109891 A1* | 4/2023 | Mori | H01M 50/564 429/179 |
| 2023/0170582 A1* | 6/2023 | Akiyama | H01M 50/483 429/157 |

FOREIGN PATENT DOCUMENTS

| | | |
|---|---|---|
| JP | 2014192041 A * | 10/2014 |
| JP | 2014192041 A | 10/2014 |
| JP | 2015220107 A | 12/2015 |
| JP | 2016001601 A | 1/2016 |
| WO | 2018123319 A1 | 7/2018 |
| WO | 2018163514 A1 | 9/2018 |
| WO | 2019167821 A1 | 9/2019 |

OTHER PUBLICATIONS

Written Opinion of the International Searching Authority issued for PCT/JP2019/032426, dated Nov. 26, 2019.

* cited by examiner

FIG. 1 - RELATED ART
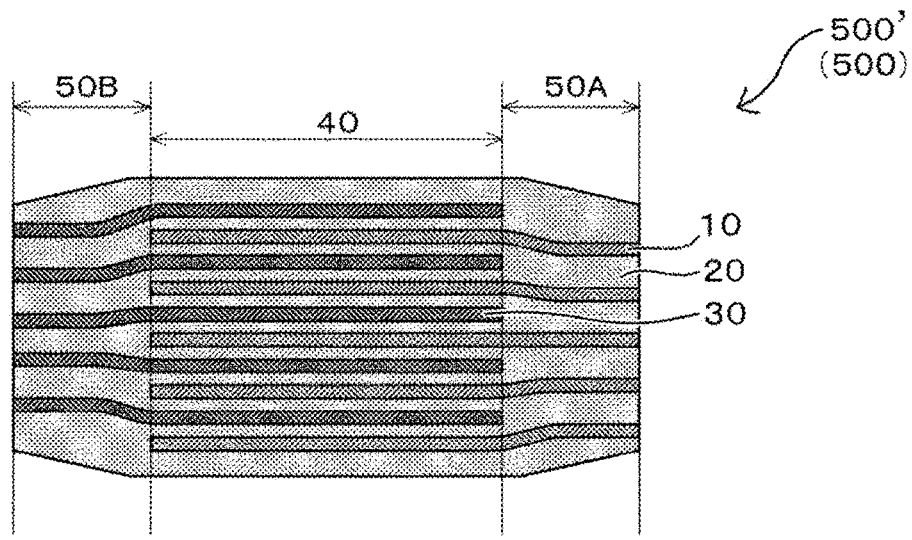
FIG. 2 - RELATED ART
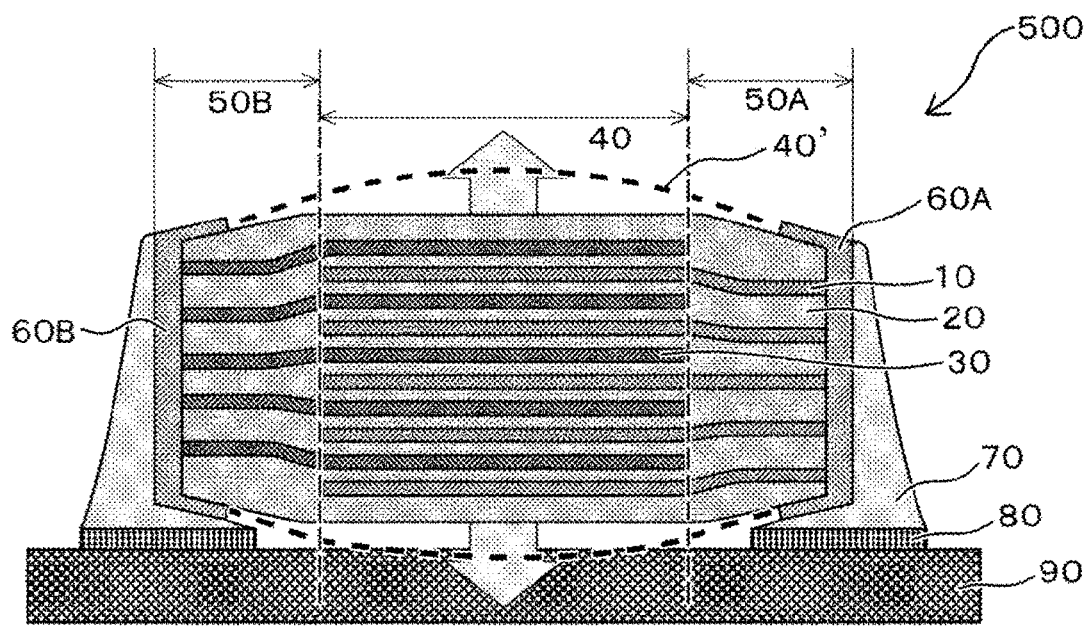

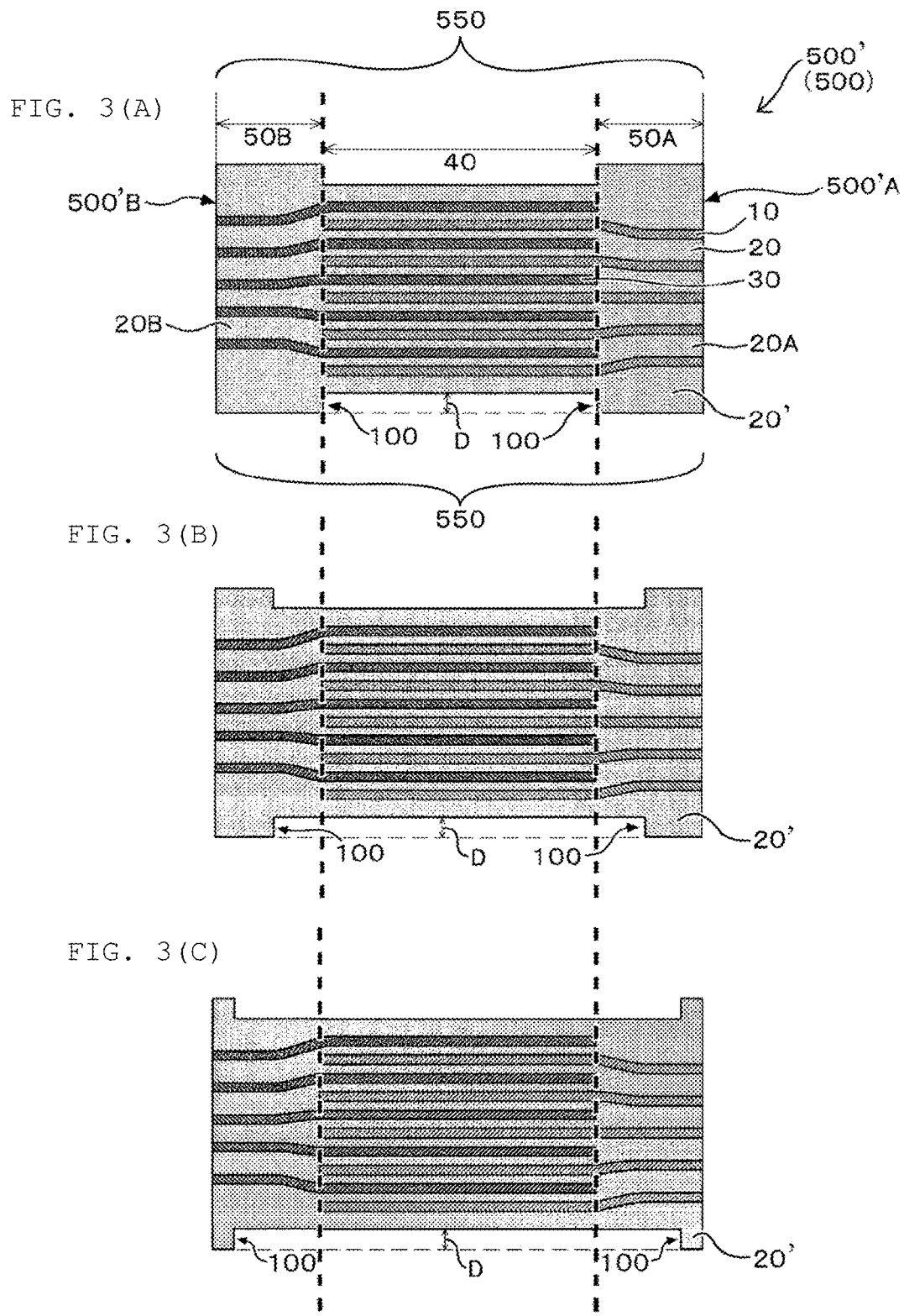

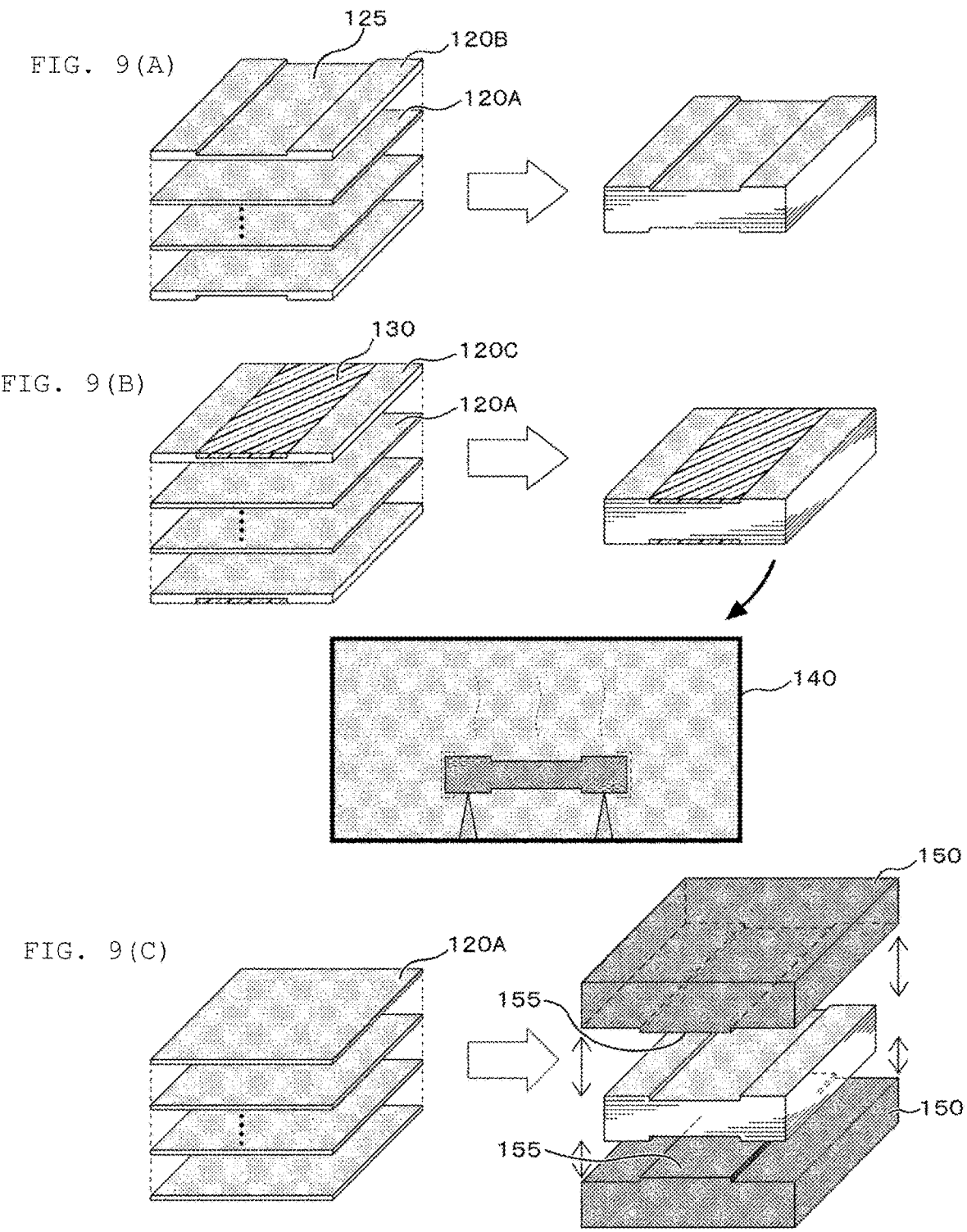

ID-STATE BATTERY

CROSS REFERENCE TO RELATED APPLICATIONS

The present application is a continuation of International application No. PCT/JP2019/032426, filed Aug. 20, 2019, which claims priority to Japanese Patent Application No. 2018-187668, filed Oct. 2, 2018, the entire contents of each of which are incorporated herein by reference.

FIELD OF THE INVENTION

The present invention relates to a solid-state battery. More specifically, the present invention relates to a laminated solid-state battery.

BACKGROUND OF THE INVENTION

Conventionally, secondary batteries capable of repeated charging and discharging have been used for various purposes. For example, the secondary batteries may be used as power sources for electronic devices such as smartphones and laptop computers.

In the secondary battery, a liquid electrolyte is generally used as a medium for moving ions contributing to charging and discharging. That is, a so-called electrolytic solution is used in the secondary battery. However, in such a secondary battery, safety is generally required in terms of preventing leakage of the electrolytic solution. An organic solvent or the like used in the electrolytic solution is a flammable material, and thus, safety is also required.

Thus, research has been conducted on solid-state batteries using solid electrolytes instead of the electrolytic solution.
Patent Document 1: Japanese Patent Application Laid-Open No. 2015-0220107
Patent Document 2: Japanese Patent Application Laid-Open No. 2016-1601.

SUMMARY OF THE INVENTION

In the electronic device of Patent Document 1, a solid-state battery that is surface-mounted on the same board as an electronic circuit has been proposed. As an example in which the solid-state battery is surface-mounted, a solid-state battery suitable for surface mounting on a printed circuit board has been proposed. A solid-state battery configured such that an area in contact with a board, an exterior, an adjacent solid-state battery, or an electronic component is small has also been proposed in Patent Document 2.

The inventor of the present application has noticed that there is a problem to be overcome in the solid-state battery for a surface-mount product, and has found that it is necessary to take measures for this problem. Specifically, the inventor of the present application has found that there are the following problems.

The solid-state battery is formed by laminating a plurality of electrode materials (for example, positive and negative electrode layers, an electrolyte layer, and a current collector layer). Thus, for example, as illustrated in FIG. 1, in a solid-state battery 500, a thickness of a part in which a positive electrode layer 10 and a negative electrode layer 30 overlap (overlapping part 40) may be thicker than those of parts in which these layers do not overlap (non-overlapping parts 50A and 50B). When the positive electrode layer 10 and the negative electrode layer 30 are charged and discharged, the electrode layers may expand and contract due to the movement of ions between the positive and negative electrode layers with a solid electrolyte layer 20 interposed therebetween. Thus, when the solid-state battery is used, the thickness of the overlapping part 40 may be further thicker than the thicknesses of the non-overlapping parts 50A and 50B.

When such a solid-state battery is surface-mounted on a board (see FIG. 2), the positive electrode layer 10 and/or the negative electrode layer 30 expand during charging and discharging, and thus, the overlapping part 40 expands. Accordingly, a main surface 40' of the expanded overlapping part and a board 90 come into contact with each other, and thus, there is a concern that the solid-state battery 500 and/or the board 90 are destroyed. As described above, the inventor of the present application has found that the solid-state battery may not be suitably used for the surface-mount product.

The present invention has been made in view of such problems. That is, a main object of the present invention is to provide a more suitable solid-state battery, especially for a surface-mount product.

The inventor of the present application has tried to solve the above-mentioned problems by coping with the above-mentioned problems in a new direction instead of coping with the above-mentioned problems in the extension of a technology of the related art. As a result, a solid-state battery which achieves the above-mentioned main object is invented.

In order to achieve the above-mentioned object, an embodiment of the present invention provides a solid-state battery including a solid-state battery laminate that includes at least one battery constituent unit including a positive electrode layer, a negative electrode layer, and a solid electrolyte layer interposed between the positive electrode layer and the negative electrode layer along a lamination direction, and defining: an overlapping part in which the positive electrode layer and the negative electrode layer overlap each other in the lamination direction, and a non-overlapping part in which the positive electrode layer and the negative electrode layer do not overlap each other in the lamination direction.

At least one main surface having a normal in the lamination direction has a recess overlapping the overlapping part and defines a step between the overlapping part and the non-overlapping part or in the non-overlapping part.

The solid-state battery of the present invention is a more suitable solid-state battery, especially for a surface-mount product.

More specifically, in the solid-state battery of the present invention, the recess is provided on at least one main surface thereof, and the recess is between the overlapping part and the non-overlapping part or in the non-overlapping part. When the solid-state battery of the present invention is the surface-mount product, the main surface having the recess can be the surface on the mount surface side, and thus, a separation distance between the main surface of the overlapping part and a board surface can be further increased. That is, even when the electrode layer expands during charging and discharging, it is possible to prevent the main surface of the overlapping part and the board from coming in contact with each other.

BRIEF EXPLANATION OF THE DRAWINGS

FIG. 1 is a sectional view schematically illustrating a solid-state battery laminate of the related art.

FIG. 2 is a sectional view schematically illustrating a solid-state battery using the solid-state battery laminate illustrated in FIG. 1 which is surface-mounted on a board.

FIGS. 3A to 3C are sectional views schematically illustrating a solid-state battery (a solid-state battery in which steps are provided by a solid electrolyte material) according to an embodiment of the present invention.

FIGS. 9A to 9C are diagrams illustrating a method for forming the recess in the main surface of the solid-state battery according to the embodiment of FIGS. 7A and 7B (FIGS. 9A and 9B: method using green sheet method, FIG. 9C: method using pressing step).

DETAILED DESCRIPTION OF THE INVENTION

Figure 4A:
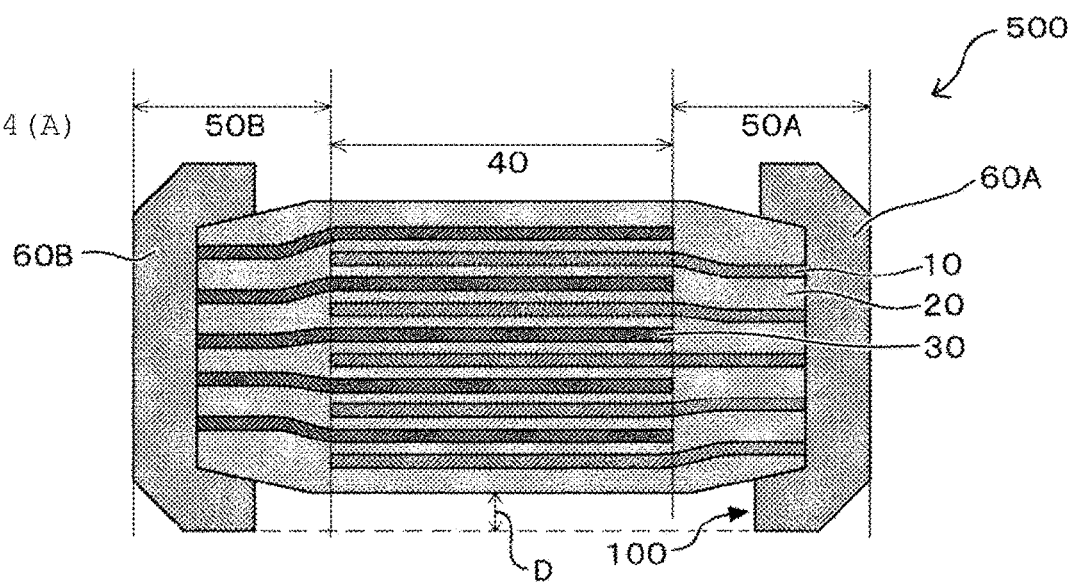
FIGS. 4A and 4B are sectional views schematically illustrating a solid-state battery (a solid-state battery in which steps are provided by a thickness of an external terminal) according to an embodiment of the present invention.

Hereinafter, a "solid-state battery" of the present invention will be described in detail. Although the present invention will be described with reference to the drawings as necessary, the illustrated contents are merely schematic and exemplary for the understanding of the present invention, and an appearance, a dimensional ratio, and the like may differ from an actual appearance and dimensional ratio.

A "plan view" mentioned in the present specification is based on a mode in which an object is viewed from above or below along a thickness direction based on a lamination direction of layers constituting the solid-state battery. A "section view" mentioned in the present specification is based on a mode when viewed from a direction substantially perpendicular to the thickness direction based on the lamination direction of the layers constituting the solid-state battery (in short, a mode when cut out by a surface parallel to the thickness direction). The term "vertical direction" and "horizontal direction" used directly or indirectly in the present specification correspond to a vertical direction and a horizontal direction in the drawings, respectively. Unless otherwise specified, the same reference symbol or sign indicates the same member and part or the same meaning. In one preferred aspect, it can be considered that a vertical downward direction (that is, a direction in which gravity acts) corresponds to a "downward direction" and an opposite direction corresponds to an "upward direction".

The "solid-state battery" mentioned in the present invention refers to a battery whose components are made of solids in a broad sense, and refers to an all-solid-state battery whose components (particularly, preferably all components) are made of solids in a narrow sense. In one preferred aspect, the solid-state battery according to the present invention is a laminated solid-state battery configured such that the layers forming a battery constituent unit are laminated to each other, and preferably such layers are made of a sintered body. The "solid-state battery" includes not only a so-called "secondary battery" capable of repeating charging and discharging, but also a "primary battery" capable of only discharging. In one preferred aspect of the invention, the "solid-state battery" is the secondary battery. The "secondary battery" is not excessively particular about a name thereof and may include, for example, a "storage device".

[Basic Configuration of Solid-State Battery]

The solid-state battery includes a laminate having at least one battery constituent unit including a positive electrode layer, a negative electrode layer, and a solid electrolyte interposed between these electrode layers along the lamination direction.

In the solid-state battery, the layers constituting the solid-state battery are formed by firing, but the positive electrode layer, the negative electrode layer, the solid electrolyte layer, and the like form a sintered layer. Preferably, the positive electrode layer, the negative electrode layer, and the solid electrolyte are integrally fired with each other, and thus, the battery constituent units form an integrally sintered body.

The positive electrode layer is an electrode layer including at least a positive electrode active material. The positive electrode layer may further include a solid electrolyte and/or a positive electrode current collector layer. In one preferred aspect, the positive electrode layer is a sintered body including at least positive electrode active material particles, solid electrolyte particles, and a positive electrode current collector layer. Meanwhile, the negative electrode layer is an electrode layer including at least a negative electrode active material. The negative electrode layer may further include a solid electrolyte and/or a negative electrode current collector layer. In one preferred aspect, the negative electrode layer is a sintered body including at least negative electrode active material particles, solid electrolyte particles, and a negative electrode current collector layer.

The positive electrode active material and the negative electrode active material are substances involved in the transfer of electrons in the solid-state battery. Ions move (conduct) between the positive electrode layer and the negative electrode layer through the solid electrolyte, and electrons are transferred. Accordingly, charging and discharging are performed. It is preferable that the positive electrode layer and the negative electrode layer are particularly layers capable of storing and emitting lithium ions. That is, it is preferable that an all-solid-state secondary battery in which the battery is charged and discharged due to the movement of lithium ions between the positive electrode layer and the negative electrode layer through the solid electrolyte is used.

(Positive Electrode Active Material)

Examples of the positive electrode active material included in the positive electrode layer include at least one selected from the group consisting of a lithium-containing phosphoric acid compound having a NASICON type structure, a lithium-containing phosphoric acid compound having an olivine type structure, a lithium-containing layered oxide, and a lithium-containing oxide having a spinel type structure. Examples of the lithium-containing phosphoric acid compound having the NASICON type structure include $Li_3V_2(PO_4)_3$. Examples of the lithium-containing phosphoric acid compound having the olivine type structure include $Li_3Fe_2(PO_4)_3$ and $LiMnPO_4$.

Examples of the lithium-containing layered oxide include $LiCoO_2$ and $LiCo_{1/3}Ni_{1/3}Mn_{1/3}O_2$. Examples of the lithium-containing oxide having the spinel type structure include $LiMn_2O_4$ and $LiNi_{0.5}Mn_{1.5}O_4$.

(Negative Electrode Active Material)

Examples of the negative electrode active material included in the negative electrode layer include at least one selected from the group consisting of an oxide including at least one element selected from the group consisting of Ti, Si, Sn, Cr, Fe, Nb, and Mo, a graphite-lithium compound, a lithium alloy, a lithium-containing phosphoric acid compound having a NASICON type structure, a lithium-containing phosphoric acid compound having an olivine type structure, and a lithium-containing oxide having a spinel type structure. Examples of the lithium alloy include Li—Al. Examples of the lithium-containing phosphoric acid compound having the NASICON type structure include $Li_3V_2(PO_4)_3$. Examples of the lithium-containing phosphoric acid compound having the olivine type structure include $Li_3Fe_2(PO_4)_3$. Examples of the lithium-containing oxide having the spinel type structure include $Li_4Ti_5O_{12}$.

The positive electrode layer and/or the negative electrode layer may include an electron conductive material. Examples of the electron conductive material included in the positive electrode layer and/or the negative electrode layer may include at least one of a metal material such as silver, palladium, gold, platinum, aluminum, copper, and nickel and carbon. Although not particularly limited, copper is preferable in that it is difficult to react with the positive electrode active material, the negative electrode active material, the solid electrolyte material, and the like and is effective in reducing an internal resistance of the solid-state battery.

The positive electrode layer and/or the negative electrode layer may include a sintering aid.

Examples of the sintering aid may include at least one selected from the group consisting of a lithium oxide, a sodium oxide, a potassium oxide, a boron oxide, a silicon oxide, a bismuth oxide, and a phosphorus oxide.

Thicknesses of the positive electrode layer and the negative electrode layer are not particularly limited, and may be, for example, 2 μm or more and 50 μm or less, particularly 5 μm or more and 30 μm or less, independently of each other.

(Solid Electrolyte)

The solid electrolyte is a material capable of conducting the lithium ions. In particular, the solid electrolyte forming the battery constituent unit of the solid-state battery forms a layer capable of conducting the lithium ions between the positive electrode layer and the negative electrode layer. The solid electrolyte may be provided at least between the positive electrode layer and the negative electrode layer. That is, the solid electrolyte may be present around the positive electrode layer and/or the negative electrode layer so as to protrude from between the positive electrode layer and the negative electrode layer. Specific examples of the solid electrolyte include a lithium-containing phosphoric acid compound having a NASICON type structure, an oxide having a perovskite structure, and an oxide having a garnet type or garnet-like type structure. Examples of the lithium-containing phosphoric acid compound having the NASICON-type structure include $Li_xM_y(PO_4)_3$ ($1 \leq x \leq 2$, $1 \leq y \leq 2$, M is at least one selected from the group consisting of Ti, Ge, Al, Ga, and Zr). Examples of the lithium-containing phosphoric acid compound having the NASICON-type structure include $Li_{1.2}Al_{0.2}Ti_{1.8}(PO_4)_3$. Examples of the oxide having the perovskite structure include $La_{0.55}Li_{0.35}TiO_3$. Examples of the oxide having the garnet type or garnet-like type structure include $Li_7La_3Zr_2O_{12}$.

The solid electrolyte layer may include a sintering aid. The sintering aid included in the solid electrolyte layer may be selected from, for example, the same materials as the sintering aid that may be included in the positive electrode layer and/or the negative electrode layer.

A thickness of the solid electrolyte layer is not particularly limited, and may be, for example, 1 μm to 15 μm, particularly 1 μm to 5 μm.

(Positive Electrode Current Collector Layer/Negative Electrode Current Collector Layer)

It is preferable that a material having a high conductivity is used as the positive electrode current collector layer constituting the positive electrode current collector layer and the negative electrode current collector layer constituting the negative electrode current collector layer, and it is preferable that at least one selected from the group consisting of silver, palladium, gold, platinum, aluminum, copper, and nickel is used. In particular, copper is preferable in that it is difficult to react with the positive electrode active material, the negative electrode active material, and the solid electrolyte material and is effective in reducing an internal resistance of the solid-state battery. Each of the positive electrode current collector layer and the negative electrode current collector layer may have an electrical connection part to be electrically connected to the outside, and may be configured to be able to be electrically connectable to a terminal. Each of the positive electrode current collector layer and the negative electrode current collector layer may be in a form of foil, but it is preferable that each layer is in a form of integral sintering from the viewpoint of improving electron conductivity and reducing manufacturing cost by integral sintering. When the positive electrode current collector layer and the negative electrode current collector layer are in a form of a sintered body, these layers may be, for example, a sintered body including an electron conductive material and a sintering aid. The electron conductive material included in the positive electrode current collector layer and the negative electrode current collector layer may be selected from, for example, the same materials as the electron conductive material that may be included in the positive electrode layer and/or the negative electrode layer. The sintering aid included in the positive electrode current collector layer and the negative electrode current collector layer may be selected from, for example, the same materials as the sintering aid that may be included in the positive electrode layer and/or the negative electrode layer.

Thicknesses of the positive electrode current collector layer and the negative electrode current collector layer are not particularly limited, and may be, for example, 1 μm to 5 μm, particularly 1 μm to 3 μm.

(Insulating Layer)

An insulating layer is formed between, for example, one battery constituent unit and the other battery constituent unit that are adjacent to each other along the lamination direction. Accordingly, it is possible to avoid the movement of the ions between such adjacent battery constituent units, and it is possible to prevent excessive storage and emission of the ions. The insulating layer may be formed so as to be adjacent to the positive electrode layer and/or the negative electrode layer in a plan view of the solid-state battery. The insulating layer refers to a material that does not conduct electricity in a broad sense, that is, a layer made of a non-conductive material, and a layer made of an insulating material in a narrow sense. Although not particularly limited, the insulating layer may be made of, for example, a glass material and a ceramic material. For example, a glass material may be selected as the insulating layer. The glass material is not particularly limited, but examples of the glass material include at least one selected from the group consisting of soda-lime glass, potash glass, borate-based glass, borosilicate-based glass, barium-borosilicate-based glass, zinc-borate-based glass, barium-borate-based glass, bismuth-borosilicate-based glass, bismuth-zinc-borate-based glass, bismuth-silicate-based glass, phosphate-based glass, aluminophosphate-based glass, and phosphate-based glass.

(Protective Layer)

A protective layer may be generally formed on the outermost side of the solid-state battery, and is used in electrical, physical, and/or chemical protection. It is preferable that a material having excellent insulation, durability, and/or moisture resistance and being environmentally safe is used as a material of the protective layer. For example, it is preferable that glass, ceramics, thermosetting resin, and/or photocurable resin are used.

(External Terminal)

External terminals are generally provided in the solid-state battery. In particular, external terminals of positive and negative electrodes are provided on a side surface of the solid-state battery so as to form a pair. More specifically, the external terminal on a positive electrode side connected to the positive electrode layer and the external terminal on a negative electrode side connected to the negative electrode layer are provided so as to form a pair. It is preferable that a material having a high conductivity is used for such external terminals. The material of the external terminal is not particularly limited, and examples thereof may include at least one selected from the group consisting of silver, gold, platinum, aluminum, copper, tin, and nickel.

[Features of Solid-State Battery of Present Invention]

The solid-state battery of the present invention includes an overlapping part in which the positive electrode layer and the negative electrode layer overlap each other and non-overlapping parts in which the positive electrode layer and the negative electrode layer do not overlap each other, and has a feature in a shape of at least one main surface of the battery body having a normal in the lamination direction.

More specifically, in the solid-state battery of the present invention, a recess is provided on at least one main surface of the battery body having the normal in the lamination direction, and the recess is positioned so as to overlap the overlapping part, and steps caused by such a recess are positioned in the non-overlapping parts. When the solid-state battery of the present invention is a surface-mount product, the main surface having the recess (particularly, one main surface of two main surfaces facing each other) may be a surface on a mount surface side (that is, a surface directly facing a board), and thus, it is possible to further increase a separation distance between the main surface of the overlapping part and a board surface. Accordingly, even when the electrode layers expand during charging and discharging, it is possible to prevent the main surface of the overlapping part and the board from coming in contact with each other.

The "overlapping part" mentioned in the present description refers to a part in which both the positive electrode layer and the negative electrode layer are present in the lamination direction of the electrodes. When both the positive electrode layer and the negative electrode layer are present in the "overlapping part" in the lamination direction, the overlapping part may include elements other than the positive electrode layer and the negative electrode layer, for example, parts such as the solid electrolyte layer, the external terminal, and the protective layer. The "non-overlapping parts" refer to parts in which either the positive electrode layer or the negative electrode layer is present in the lamination direction or neither the positive electrode layer nor the negative electrode layer is present. When either the positive electrode layer or the negative electrode layer is present or when neither the positive electrode layer nor the negative electrode layer is present in the "non-overlapping parts" in the lamination direction, the non-overlapping parts may include, for example, parts such as the solid electrolyte layer, the external terminal, and the protective layer.

The "main surface" mentioned in the present description refers to a surface having a normal in the lamination direction of the electrodes in the solid-state battery. The "at least one main surface" refers to both or one of two main surfaces facing each other. When the solid-state battery is the surface-mount product, one of the "at least one main surface" may be the surface on the mount surface side. The "recess" refers to a shape in which a part of the main surface is recessed by steps positioned around this part. In other words, the recess refers that there are parts having different thicknesses in the solid-state battery and thicknesses of "step" parts are thicker than a thickness of the "recess" part. Here, the "steps" on the main surface refers to parts having a form in which surfaces forming the steps protrude along the lamination direction. The "steps" may be parts having a protrusion form so as to form a slope in a tapered shape (that is, to form an angle with respect to the lamination direction).

The "solid-state battery laminate" mentioned in the present description includes at least one battery constituent unit including the positive electrode layer, the negative electrode layer, and the solid electrolyte layer interposed between the positive electrode layer and the negative electrode layer along the lamination direction. In an exemplary aspect illustrated in FIG. 3A, a solid-state battery laminate 500' includes a plurality of battery constituent units in which the positive electrode layer 10, the solid electrolyte layer 20, and the negative electrode layer 30 are provided in this order in section view. Here, the solid-state battery laminate 500' includes a part in which the positive electrode layer 10 and/or the negative electrode layer 30 are continuously laminated with the solid electrolyte layer 20 interposed therebetween, that is, a part including the battery constituent unit in section view.

In the exemplary aspect illustrated in FIG. 3A, the solid electrolyte layer 20 is interposed between the positive electrode layer 10 and the negative electrode layer 30 in an overlapping part 40. In the exemplary aspect illustrated in FIG. 3A, the solid electrolyte layer 20A may be interposed between two positive electrode layers 10 adjacent to each other in a non-overlapping part 50A and/or between two negative electrode layers 30 adjacent to each other in a non-overlapping part 50B.

The solid-state battery laminate includes the battery constituent units, or a solid electrolyte material present outside the part including the battery constituent units. Here, the "solid electrolyte material present outside" refers to, for example, a solid electrolyte material 20' provided outside the part including the battery constituent units (that is, the part in which the positive electrode layer 10 and the negative electrode layer 30 are continuously laminated with the solid electrolyte layer 20 interposed therebetween) in section view of the solid-state battery laminate 500' in the exemplary aspect illustrated in FIG. 3A. In an exemplary aspect illustrated in FIG. 7A, the solid electrolyte material present outside refers to a solid electrolyte material 20' provided outside the part in which the battery constituent units are present (that is, parts of a positive electrode layer part 10A, a negative electrode layer part 30B, and an overlapping part 40) in a plan view of the solid-state battery laminate 500'.

In one preferred aspect, a solid electrolyte material is provided so as to be present in an outermost part in the lamination direction of the solid-state battery laminate, and thus, the steps in the non-overlapping parts are formed by such a solid electrolyte material. Here, the "outermost part in the lamination direction" refers to a part positioned on the outermost side in the lamination direction when the solid-state battery laminate is viewed in section view.

In the exemplary aspect illustrated in FIG. 3A, the positive electrode layer 10, the solid electrolyte layer 20, and the negative electrode layer 30 are provided in this order in section view of the solid-state battery laminate 500'. The positive electrode layer 10 and the negative electrode layer 30 extend so as to be terminated at an end face 500'A on the positive electrode side and an end face 500'B on the negative electrode side, respectively. The positive electrode layer 10 and the negative electrode layer 30 are exposed on the end face 500'A on the positive electrode side and the end face 500'B on the negative electrode side, respectively. Such a solid-state battery 500 includes the overlapping part 40 in which the positive electrode layer 10 and the negative electrode layer 30 overlap, and the non-overlapping part 50A on the positive electrode side and the non-overlapping part 50B on the negative electrode side in which the positive electrode layer 10 and the negative electrode layer 30 do not overlap. The solid electrolyte material 20' is provided in the solid-state battery laminate 500' so as to be present in the outermost part in the lamination direction. Here, steps 100 are formed by the solid electrolyte materials 20' in the non-overlapping parts 50A and 50B such that a recess is formed by a main surface 550 of the solid-state battery 500.

The steps 100 may be formed at boundaries between the overlapping part 40 and the non-overlapping part 50A and/or 50B (see FIG. 3A), and may be formed in either of the non-overlapping parts 50A and 50B as illustrated in FIG. 3B or FIG. 3C. Such steps are formed together with the form of the solid electrolyte material, and thus, it is possible to position the steps more easily.

In one preferred aspect, the steps in the non-overlapping parts are formed by the thicknesses of the external terminals extending to reach at least one main surface of the solid-state battery laminate. In an exemplary aspect illustrated in FIG. 4A, a positive electrode terminal 60A electrically connected to the positive electrode layer 10 and a negative electrode terminal 60B electrically connected to the negative electrode layer 30 extend to reach the main surface on facing side surfaces of the solid-state battery laminate, that is, in end parts of the non-overlapping part 50A on the positive electrode side and the non-overlapping part 50B on the negative electrode side, respectively. As can be seen from the illustrated form, the steps 100 are formed by thicknesses of the positive electrode terminal 60A and the negative electrode terminal 60B such that the recess is formed on the main surface of the solid-state battery 500.

Figure 4B:
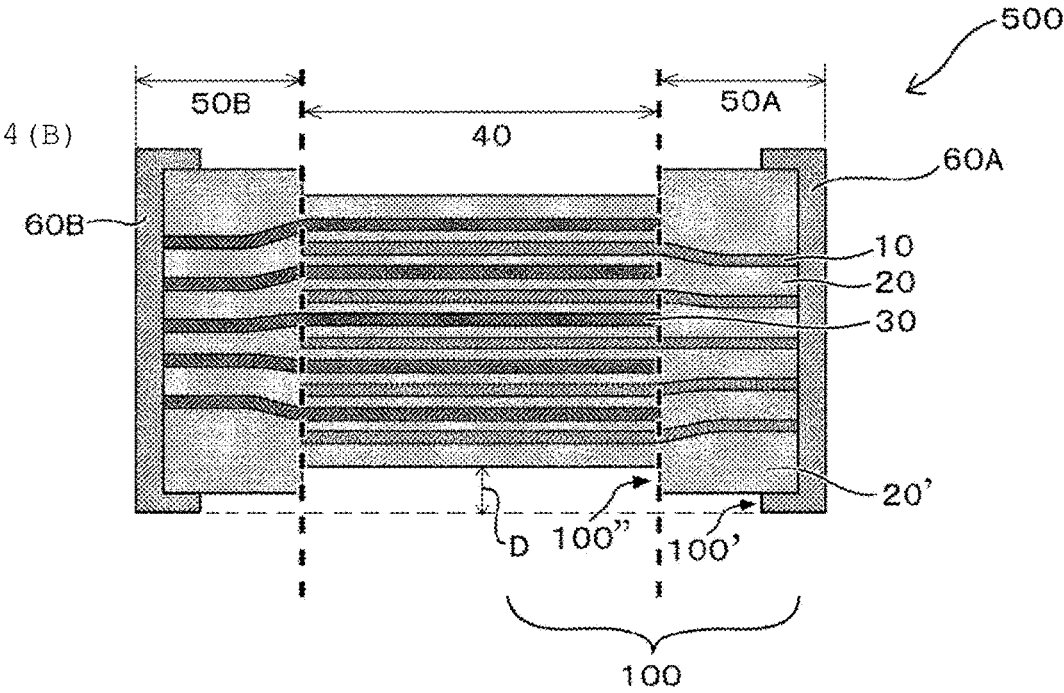

In another preferred aspect, as illustrated in FIG. 4B, the steps 100 are formed by a step 100' (first sub-step) formed by the thickness of the external terminal reaching the main surface and a step 100" (a second sub-step) formed by the solid electrolyte material 20'. The steps are formed from the two elements in this manner, and thus, a desired larger dimension of the step (that is, "D" in FIG. 4B) can be more easily achieved. The "dimension of the step" mentioned in the present specification corresponds to the separation distance between the main surface of the overlapping part and the board in the solid-state battery when it is assumed the solid-state battery is surface-mounted.

As described above, the solid electrolyte material 20' provided in the outermost part in the lamination direction of the solid-state battery laminate may form the steps 100 (see FIGS. 3A to 3C), and the thicknesses of the external terminals (60A and/or 60B) extending to reach at least one main surface of the solid-state battery may form the steps 100 (see FIG. 4A). A combination of the solid electrolyte material 20' provided in the outermost part in the lamination direction of the solid-state battery laminate and the thicknesses of the external terminals (60A and/or 60B) extending to reach at least one main surface may form the steps 100 (see FIG. 4B). A thickness of the protective layer in the non-overlapping part provided in the solid-state battery laminate may contribute to the formation of the steps.

In one preferred aspect, a dimension of the step on one main surface on which the recess is provided (that is, "D" in FIGS. 3 and 4) is 1% to 10% of a thickness of the overlapping part (that is, a thickness of the overlapping part 40 in section view in FIGS. 3 and 4) in the lamination direction. The dimension of such a step is 1% or more of the thickness of the overlapping part, and thus, it is possible to prevent the overlapping part 40 more effectively which expands during charging and discharging from coming into contact with the board. The dimension of such a step is 10% or less of the thickness of the overlapping part, and thus, it is possible to prevent the board on which the solid-state battery is mounted from becoming excessively bulky. Preferably, the dimension of such a step may be 2% to 5% of the thickness of the overlapping part. The dimension of such a step is formed together with the form of the solid electrolyte material, and thus, the desired dimension of the step can be more easily achieved.

The dimension in the lamination direction mentioned in the present specification refers to the dimension measured based on the shape viewed in section view. In particular, the "dimension of the step" and the "thickness of the overlapping part" may be non-destructively measured by using a 3D shape measuring instrument (VK-X1000 manufactured by Keyence corporation).

From the viewpoint of surface mounting, the steps may be positioned in both the non-overlapping part on the positive electrode side and the non-overlapping part on the negative electrode side, and the dimensions of the steps on the non-overlapping part on the positive electrode side and the non-overlapping part on the negative electrode side in the lamination direction may be equal. The steps may be positioned in the non-overlapping part on the positive electrode side and the non-overlapping part on the negative electrode side on both of the facing main surfaces of the solid-state battery such that the solid-state battery can be mounted on either of the two surfaces. In the exemplary aspect illustrated in FIG. 3A, the steps are positioned in the non-overlapping parts 50A and 50B on both of the facing main surfaces 550 of the solid-state battery 500.

When the solid-state battery having the above-described configuration is surface-mounted (see FIGS. 5 and 6), the separation distance between the main surface of the overlapping part 40 and a board 90 can be further increased, and it is possible to prevent an extended main surface 40' of the overlapping part and the board 90 from coming into contact with each other. As can be seen from the aspect illustrated in FIGS. 5 and 6, the solid-state battery of the present invention can be said to be a surface-mount device (SMD) type battery.

The solid-state battery of the present description can be suitably mounted on a board such as a printed circuit board. For example, the solid-state battery can be surface-mounted through reflow soldering or the like. A protection circuit and the like that protect the solid-state battery from overcharge and overdischarge or overcurrent may be provided on the board. Board terminals for electrically connecting the solid-state battery may be provided on the board.

Figure 7A:
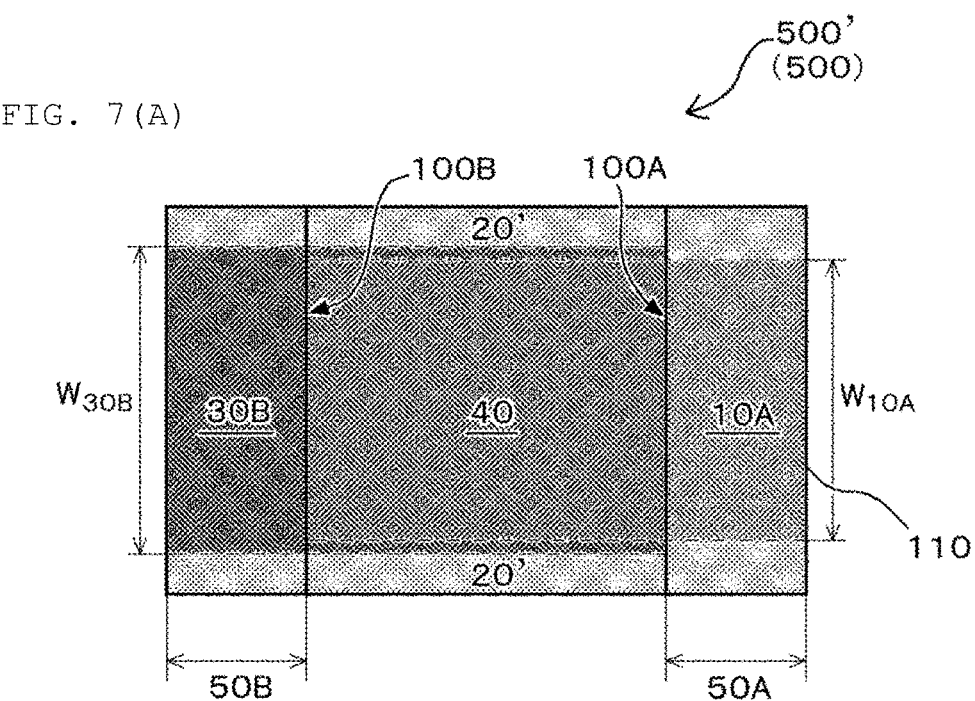
FIGS. 7A and 7B are schematic views of a solid-state battery (a solid-state battery in which a recess is provided up to any edge of a main surface) according to an embodiment of the present invention (FIG. 7A: plan view, FIG. 7B: perspective view).
Figure 7B:
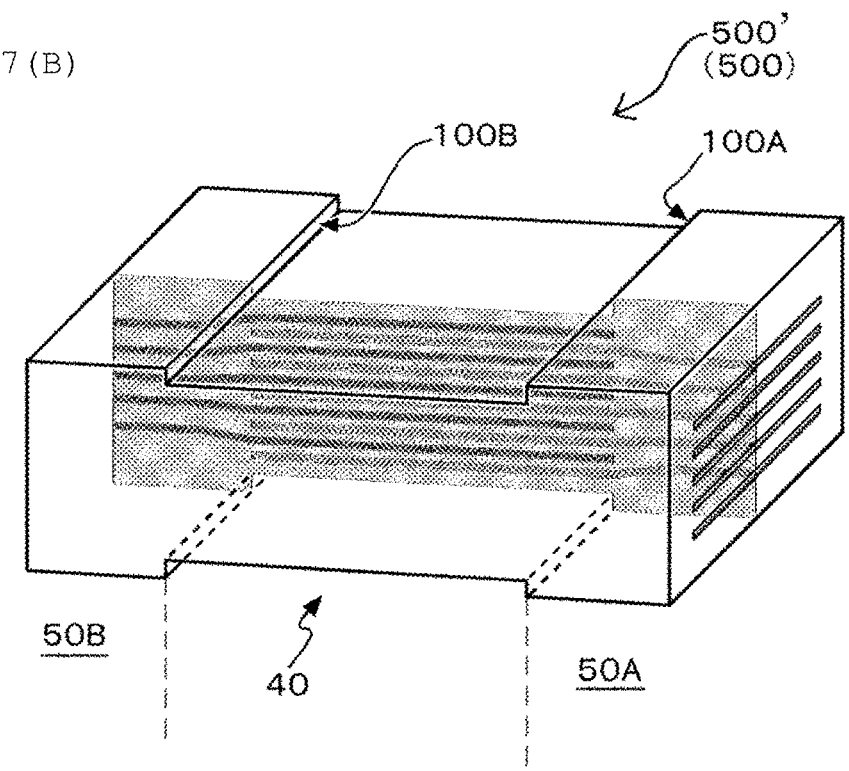

In one preferred aspect, the recess is positioned so as to reach any edge of at least one main surface of the solid-state battery laminate. As illustrated in FIGS. 7A and 7B, the part including the positive electrode layer part 10A, the negative electrode layer part 30B, and the overlapping part 40 (that is, the part in which the battery constituent units are present) and the solid electrolyte material 20' on outside such a part are provided in a plan view of the solid-state battery laminate 500'. The "positive electrode layer part 10A" refers to a part in which only the positive electrode layer of the electrode layers is present in a plan view of the solid-state battery laminate 500', and the "negative electrode layer part 30B" refers to a part in which only the negative electrode layer is present. From the viewpoint of ionic conduction, a width dimension $W_{30B}$ of the negative electrode layer part 30B is formed to be larger than a width dimension $W_{10A}$ of the positive electrode layer part 10A. Here, a step 100A is positioned at a boundary between the non-overlapping part 50A on the positive electrode side and the overlapping part 40, and a step 100B is positioned at a boundary between the non-overlapping part 50B on the negative electrode side and the overlapping part 40. Accordingly, the recess on the main surface is positioned such that the electrode layer reaches the facing end faces (edges) that are not terminated outward.

With the above configuration, when the solid-state battery is surface-mounted, a space open to the outside is provided between the main surface of the solid-state battery and the board on the mount surface side, and thus, such a space can be used as a flow path for a surrounding atmosphere. Although not particular about a particular theory, gas flow characteristics between the main surface of the solid-state battery and the board on the mount surface side are improved, and thus, it is possible to prevent the solid-state battery from overheating. In the reflow soldering at the time of surface mounting, since a space in which a molten and expanded solder spreads can be further secured, a solder flash can be prevented.

Figure 8A:
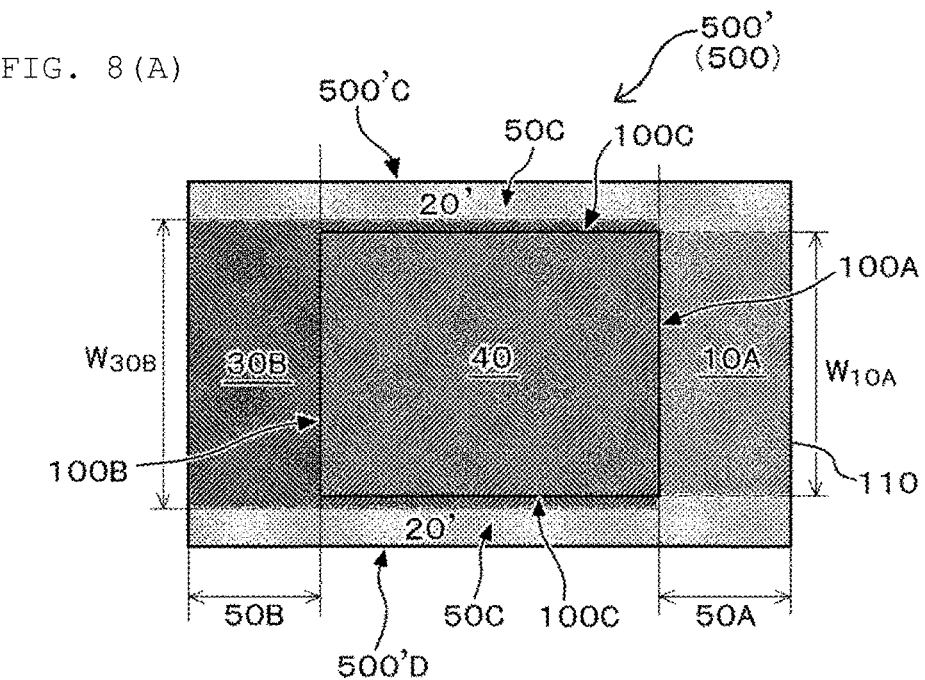
FIGS. 8A and 8B are schematic views of a solid-state battery (a solid-state battery in which a recess is provided inside the edge of the main surface) according to an embodiment of the present invention (FIG. 8A: plan view, FIG. 8B: perspective view).
Figure 8B:
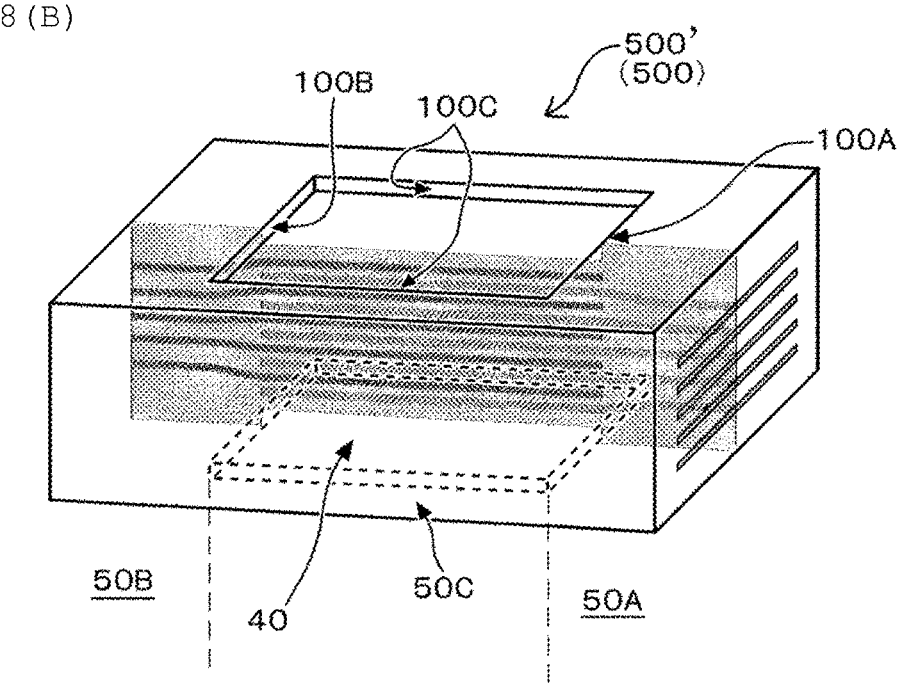

In another preferred aspect, the recess is positioned inside the edge so as not to reach the edge of at least one main surface of the solid-state battery laminate. As illustrated in FIGS. 8A and 8B, the solid electrolyte material 20' (a non-overlapping part 50C on a central side) is provided between end faces of the positive electrode layer part 10A and the negative electrode layer part 30B on which the electrode layers are not terminated outward (that is, on end surfaces of 500'C and 500'D in FIG. 8A) and the overlapping part 40 in a plan view of the solid-state battery 500. In this case, the step 100A is positioned at the boundary between the non-overlapping part 50A on the positive electrode side and the overlapping part 40 in the solid-state battery 500, and the step 100B is positioned at the boundary between the non-overlapping part 50B on the negative electrode side and the overlapping part 40. A step 100C is positioned at a boundary between the non-overlapping part 50C on the center side and the overlapping part 40. Accordingly, the recess is positioned inside the edge 110 such that the recess does not reach an edge 110 of the main surface.

With such a configuration, a smaller gap between the main surface of the solid-state battery and the board surface (that is, a gap between the entire main surface other than the overlapping part 40 and the board) can be formed at the entire circumference of the main surface. Accordingly, when the entire solid-state battery is molded with resin after the solid-state battery is surface-mounted, it is possible to prevent the resin from flowing into the space between the main surface of the overlapping part of the solid-state battery and the board. That is, it is possible to prevent an inconvenient phenomenon in which the inflowing resin reduces a clearance provided between the main surface of the overlapping part of the solid-state battery and the board surface.

[Method for Manufacturing Solid-State Battery]

As described above, the solid-state battery of the present invention can be manufactured by a printing method such as a screen printing method, a green sheet method using a green sheet, or a combination method thereof. In one aspect, it is possible to finally manufacture the solid-state battery according to an embodiment of the present invention by forming a predetermined laminate by the green sheet method and providing a solid electrolyte layer sheet or the like to a side region of a laminate at a forming stage by the screen printing. Hereinafter, the present invention will be described on the assumption of this aspect, but the present invention is not limited thereto, and the predetermined laminate may be formed by the screen printing method or the like.

(Step of Forming Unfired Laminate)

First, a paste for the solid electrolyte layer, a paste for the positive electrode active material layer, a paste for the positive electrode current collector layer, a paste for the negative electrode active material layer, a paste for the negative electrode current collector layer, a paste for the insulating layer, and a paste for the protective layer are coated on each substrate (for example, PET film).

Each paste can be prepared by wet-mixing a predetermined constituent material of each layer appropriately selected from the group consisting of a positive electrode active material, a negative electrode active material, a conductive material, a solid electrolyte material, an insulating material, and a sintering aid with an organic vehicle in which an organic material is dissolved in a solvent. Examples of the paste for the positive electrode active material layer include a positive electrode active material, a conductive material, a solid electrolyte material, an organic material, and a solvent. Examples of the paste for the negative electrode active material layer include a negative electrode active material, a conductive material, a solid electrolyte material, an organic material, and a solvent. Examples of the paste for the positive electrode current collector layer and the paste for the negative electrode current collector layer may include at least one selected from the group consisting of silver, palladium, gold, platinum, aluminum, copper, and nickel. Examples of the paste for the solid electrolyte layer include a solid electrolyte material, a sintering aid, an organic material, and a solvent. Examples of the paste for the protective layer include an insulating material, an organic material, and a solvent. Examples of the past for the insulating layer include an insulating material, an organic material, and a solvent.

In the wet mixing, a medium can be used, and specifically, a ball mill method, a viscomill method, or the like can be used. Meanwhile, a wet mixing method that does not use the medium may be used, and a sand mill method, a high-pressure homogenizer method, a kneader dispersion method, or the like can be used.

As the solid electrolyte material included in the paste for the solid electrolyte layer, powder including a lithium-containing phosphoric acid compound having a NASICON type structure, an oxide having a perovskite structure, and/or an oxide having a garnet type or garnet-like type structure may be selected.

Examples of the positive electrode active material included in the paste for the positive electrode active material include at least one selected from the group consisting of a lithium-containing phosphoric acid compound having a NASICON type structure, a lithium-containing phosphoric acid compound having an olivine type structure, a lithium-containing layered oxide, and a lithium-containing oxide having a spinel type structure.

Examples of the insulating material included in the paste for the insulating layer may include a glass material and a ceramic material. It is preferable that examples of the insulating material included in the paste for the protective layer use at least one selected from the group consisting of a glass material, a ceramic material, a thermosetting resin material, and a photocurable resin material.

The organic material included in the paste is not particularly limited, but at least one polymer material selected from the group consisting of a polyvinyl acetal resin, a cellulose resin, a polyacrylic resin, a polyurethane resin, a polyvinyl acetate resin, and a polyvinyl alcohol resin can be used. The solvent is not particularly limited as long as the solvent can dissolve the organic material, and for example, toluene and/or ethanol can be used.

Examples of the negative electrode active material included in the paste for the negative electrode active material layer may include a negative electrode active material which is at least one selected from the group consisting of an oxide including at least one element selected from the group consisting of Ti, Si, Sn, Cr, Fe, Nb, and Mo, a graphite-lithium compound, a lithium alloy, a lithium-containing phosphoric acid compound having a NASICON type structure, a lithium-containing phosphoric acid compound having an olivine type structure, and a lithium-containing oxide having a spinel type structure, a material included in the solid electrolyte paste, and a conductive material.

The sintering aid may be at least one selected from the group consisting of a lithium oxide, a sodium oxide, a potassium oxide, a boron oxide, a silicon oxide, a bismuth oxide, and a phosphorus oxide.

The coated pastes dried on a hot plate heated to 30° C. to 50° C., and thus, a solid electrolyte layer sheet, positive electrode and negative electrode sheets, and an insulating layer sheet are formed on a substrate (for example, PET film) in a predetermined shape at a predetermined thickness.

Next, the sheets are peeled off from the substrate. After peeling, the sheets of the components of one battery constituent unit are sequentially laminated along the lamination direction, and then the insulating layer sheet is laminated. Thereafter, the sheets of the components of the other battery constituent unit are sequentially laminated on the insulating layer sheet along the lamination direction. The solid electrolyte layer sheet or the insulating layer sheet may be provided by the screen printing in the side region of the electrode sheet after laminating and before pressing later.

(Pressing Step)

Subsequently, it is preferable that heat and pressure bonding at a predetermined pressure (for example, 50 MPa to 100 MPa) and subsequent isotropic pressure pressing at a predetermined pressure (for example, 150 MPa to 300 MPa) are performed. From the above, the predetermined laminated body can be formed.

(Firing Step)

The obtained predetermined laminate is fired. The firing is performed by heating the predetermined laminate in a nitrogen gas atmosphere or in an atmosphere, for example, at 600° C. to 1000° C.

(Regarding Preparation of a Characteristic Part using Solid Electrolyte Layer)

A method for manufacturing the solid-state battery according to the present invention in which the recess is provided on at least one main surface having the normal in the lamination direction, the recess is positioned so as to overlap at least the overlapping part, and the steps caused by the recess are positioned in the non-overlapping parts will be described below as an example.

A first exemplary manufacturing method includes a step of laminating a recess-shaped or hollow solid electrolyte green sheet and another green sheet including an electrode layer and the like by coating, a step of pressing an unfired laminate obtained in the laminating step in a mold, and a step of firing the unfired laminate after pressing. In the laminating step, the sheets are positioned and laminated such that a range corresponding to a recess-shaped part or a hollow part in a plan view of the recess-shaped or hollow solid electrolyte green sheet overlaps a range corresponding to the overlapping part of the positive electrode layer and the negative electrode layer in a plan view of the other green sheet. The recess-shaped or hollow solid electrolyte green sheet may be laminated at any position in the unfired laminate, but it is preferable that the recess-shaped or hollow solid electrolyte green sheet is laminated on an outermost layer of the unfired laminate from the viewpoint of processability and uniformity of a lamination structure. Such a manufacturing method is used, and thus, a desired solid-state battery according to the present invention can be obtained.

The present invention will be described with reference to an exemplary aspect illustrated in FIG. 9A. As illustrated in this figure, a flat plate-shaped green sheet 120A and a recess-shaped green sheet 120B are laminated such that the recess-shaped green sheet 120B is positioned on an outermost surface. At this time, a recess-shaped part 125 of the recess-shaped green sheet 120B is positioned and laminated so as to overlap a range corresponding to the overlapping part of the positive electrode layer and the negative electrode layer of the flat plate-shaped green sheet 120A. The desired solid-state battery of the present invention can be obtained by pressing the obtained unsintered laminate in the mold and then firing the laminate.

As a second exemplary manufacturing method, there is a method using a green sheet formed by using a resin raw material paste or a resin filler in which a part corresponding to the recess shape or hollow disappears during firing instead of the recess-shaped or hollow solid electrolyte green sheet in the first manufacturing method. Other steps are the same as those of the first manufacturing method.

The present invention will be described with reference to an exemplary aspect illustrated in FIG. 9B. As illustrated in this figure, the flat plate-shaped green sheet 120A and a green sheet 120C using a raw material disappearing during firing are laminated such that the green sheet 120C using the raw material disappearing during firing is positioned on the outermost surface. At this time, a raw material part 130 disappearing during firing in the green sheet 120C is positioned and laminated so as to overlap the range corresponding to the overlapping part of the positive electrode layer and the negative electrode layer in the flat plate-shaped green sheet 120A. The desired solid-state battery of the present invention can be obtained by pressing the obtained unsintered laminate in the mold and then firing the laminate in an oven 140 while vaporizing the raw material part 130 during firing.

A third exemplary manufacturing method is a step of laminating all the electrode layer, the solid electrolyte layer, and the like as flat plate-shaped green sheets, a step of pressing the unfired laminate obtained in the laminating step in a protrusion-shaped mold, and a step of firing the unfired laminate after pressing. In the pressing step, a range of a protrusion-shaped part in the protrusion-shaped mold is positioned and pressed so as to overlap the range corresponding to the overlapping part of the positive electrode layer and the negative electrode layer in a plan view of the green sheet. Such a manufacturing method is used, and thus, a desired solid-state battery according to the present invention can be obtained.

The present invention will be described with reference to an exemplary aspect illustrated in FIG. 9C. As illustrated in this figure, flat plate-shaped green sheets 120A are laminated, and the obtained unsintered laminate is pressed in the protrusion-shaped mold 150. At this time, a protrusion-shaped part 155 in the protrusion-shaped mold is positioned and pressed so as to overlap the range corresponding to the overlapping part of the positive electrode layer and the negative electrode layer in the flat plate-shaped green sheet 120A. Subsequently, the desired solid-state battery in the present invention can be obtained by firing the unfired laminate after pressing.

Subsequently, the external terminals are attached to the obtained solid-state battery. The terminals are provided so as to be able to be electrically connectable to the positive electrode layer and the negative electrode layer, respectively. For example, it is preferable that the external terminals are formed by sputtering or the like. Although not particularly limited, it is preferable that the external terminal is made of at least one selected from silver, gold, platinum, aluminum, copper, tin, and nickel. In order to provide the recess on the main surface having the normal in the lamination direction in the present invention, the external terminals can be provided so as to reach the main surface of the solid-state battery. The thickness of the external terminal can be adjusted such that the desired dimension of the step in the lamination direction is obtained.

It is preferable that the protective layer is provided to the extent that the terminals are not covered by sputtering, spray coating, or the like. In order to provide the recess having the normal in the lamination direction in the present invention, the protective layer is provided so as to reach at least the main surface of the solid-state battery, and the part of the protective layer can be formed to be thicker than the other parts.

(Surface Mounting on Board)

Figure 5:
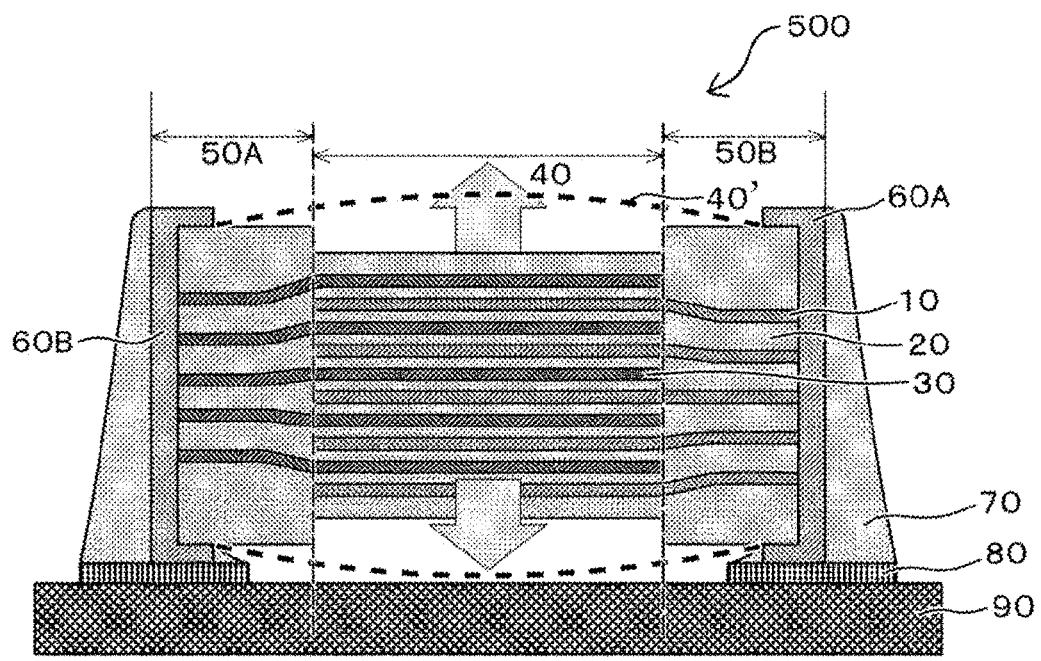
FIG. 5 is a sectional view schematically illustrating the solid-state battery according to the embodiment of FIG. 3A which is surface-mounted on the board.
Figure 6:
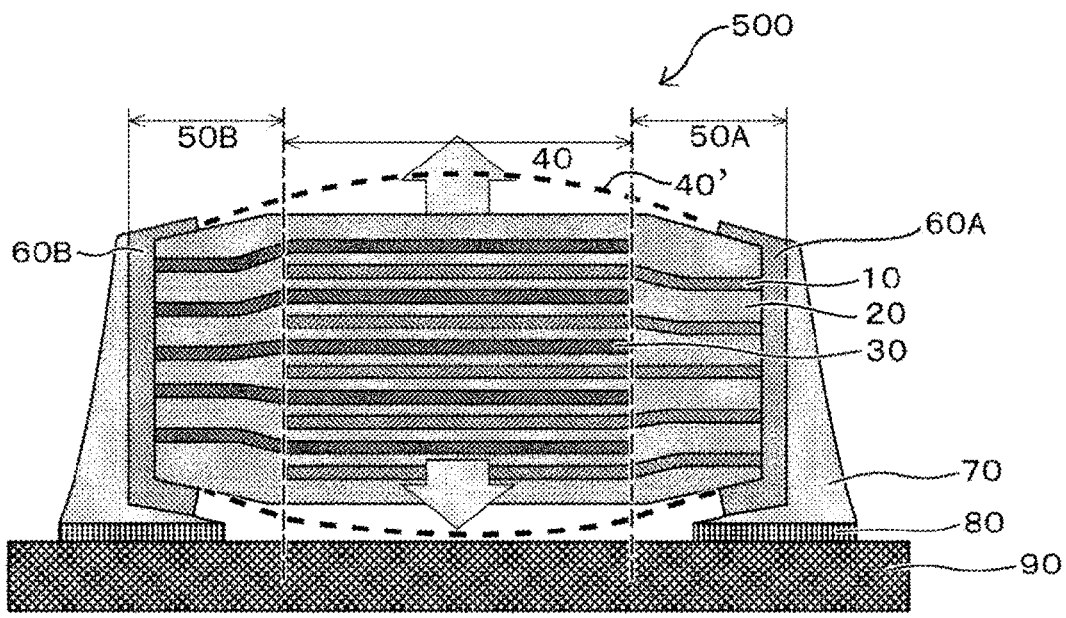
FIG. 6 is a sectional view schematically illustrating the solid-state battery according to the embodiment of FIG. 4A which is surface-mounted on the board.

The solid-state battery can be surface-mounted and connected to the board by providing the external terminals. The solid-state battery is disposed by aligning the positions of the positive electrode terminal and the negative electrode terminal with positions at which a bonding material is applied on board terminals of the board such that the main surface having the recess in the solid-state battery is the surface on the mount surface side, and thus, the mounting of the solid-state battery on the board is performed. Solder for electrical wiring may be used as the bonding material. Thereafter, the positive electrode terminal and the negative electrode terminal are bonded to the board by the bonding material by reflow soldering, and thus, the battery mounting board is obtained. Specifically, as illustrated in FIG. 5, the solid-state battery 500 is disposed by aligning the positive electrode terminal 60A and the negative electrode terminal 60B with the positions at which a bonding material 70 is applied on a board terminal 80 of the board 90, and 60A and the negative electrode terminal 60B are bonded to the board 90 by the bonding material 70 by reflow soldering.

Although specific embodiments of the present invention have been described above, these embodiments are mere examples. Accordingly, the present invention is not limited thereto, and those skilled in the art will easily understand that various aspects can be considered without changing the gist of the present invention.

For example, although the solid-state battery illustrated in FIG. 3 and the like has been mainly described, the present invention is not necessarily limited thereto. The present invention is similarly applicable to any battery as long as the battery includes the positive electrode layer, the negative electrode layer, and the solid electrolyte layer, the recess is provided on at least one main surface having the normal in the lamination direction, the recess is positioned so as to overlap the overlapping part, and the steps caused by the recess are positioned in the non-overlapping parts.

The solid-state battery of the present invention can be used in various fields in which storage is expected. Although merely an example, the solid-state battery of the present invention can be used in the fields of electrical, information, and communication (for example, mobile device fields such as mobile phones, smartphones, laptop computers, digital cameras, activity meters, arm computers, and electronic papers) in which mobile devices and the like are used, home and small industrial applications (for example, fields of electric tools, golf carts, and home, nursing, and industrial robots), large industrial applications (for example, fields of forklifts, elevators, and bay port cranes), transportation system fields (for example, fields such as hybrid cars, electric cars, buses, trains, electric assist bicycles, and electric motorcycles), power system applications (for example, fields such as various kinds of power generation, road conditioners, smart grids, and general household installation type power storage systems), medical applications (medical device fields such as earphone hearing aids), pharmaceutical applications (fields such as dose management systems), IoT fields, and space and deep sea applications (for example, fields such as space explorers and submersible research vessels).

DESCRIPTION OF REFERENCE SYMBOLS

10: Positive electrode layer
10A: Positive electrode layer part
20: Solid electrolyte layer
20A: Solid electrolyte layer between two positive electrode layers 10 facing each other
20B: Solid electrolyte layer between two negative electrode layers 10 facing each other
20': Solid electrolyte material
30: Negative electrode layer
30B: Negative electrode layer part
40: Overlapping part
40': Main surface of expanded overlapping part
50: Non-overlapping part
50A: Non-overlapping part on positive electrode side
50B: Non-overlapping part on negative electrode side
50C: Non-overlapping part on central side
60: External terminal
60A: Positive electrode terminal
60B: Negative electrode terminal
70: Bonding material 80: Board terminal
90: Board
100: Step
100': First sub-step
100": Second sub-step
100A: Step between non-overlapping part on positive electrode side and overlapping part
100B: Step between non-overlapping part on negative electrode side and overlapping part
100C: Step between non-overlapping part on central side and overlapping part
110: Edge
120: Green sheet
120A: Flat plate-shaped green sheet
120B: Recess-shaped green sheet
120C: Green sheet using raw material disappearing during firing
125: Recess-shaped part in recess-shaped green sheet
130: Raw material paste disappearing during firing
140: Oven
150: Protrusion-shaped mold
155: Protrusion-shaped part in protrusion-shaped mold
500': Solid-state battery laminate
500'A: End face on positive electrode side
500'B: End face on negative electrode side
500'C to D: End face on which electrode layer is not terminated
500: Solid-state battery
550: Facing main surfaces of solid-state battery

The invention claimed is:

1. A solid-state battery comprising:
a solid-state battery laminate that includes at least one battery constituent unit including a positive electrode layer, a negative electrode layer, and a solid electrolyte layer interposed between the positive electrode layer and the negative electrode layer along a lamination direction, and defining:
an overlapping part in which the positive electrode layer and the negative electrode layer overlap each other in the lamination direction, and
a non-overlapping part in which the positive electrode layer and/or the negative electrode layer do not overlap each other in the lamination direction; and
the solid-state battery laminate has a recess on at least one main surface having a normal in the lamination direction, the recess overlapping the overlapping part and defining a step between the overlapping part and the non-overlapping part or in the non-overlapping part.

2. The solid-state battery according to claim 1, further comprising a solid electrolyte material in an outermost part in the lamination direction of the solid-state battery laminate in the non-overlapping part, and wherein the solid electrolyte material defines the step.

3. The solid-state battery according to claim 2, further comprising:
an external terminal on a side surface of the solid-state battery laminate, the external terminal extending to reach the at least one main surface, and wherein
a thickness of the external terminal extending to reach the at least one main surface defines the step in cooperation with the solid electrolyte material.

4. The solid-state battery according to claim 1, wherein the non-overlapping part includes a first non-overlapping part having the positive electrode layer and not the negative electrode layer in the lamination direction, and a second non-overlapping part having the negative electrode layer and not the positive electrode in the lamination direction.

5. The solid-state battery according to claim 4, further comprising:
a first solid electrolyte material in an outermost part in the lamination direction of the solid-state battery laminate in the first non-overlapping part; and
a second solid electrolyte material in an outermost part in the lamination direction of the solid-state battery laminate in the second non-overlapping part,
wherein the first solid electrolyte material and the second solid electrolyte material define the recess.

6. The solid-state battery according to claim 5, further comprising:
a first external terminal on a first side surface of the solid-state battery laminate, the first external terminal extending to reach the at least one main surface; and
a second external terminal on a second side surface of the solid-state battery laminate opposite the first side surface, the second external terminal extending to reach the at least one main surface, and wherein
a thickness of the first external terminal and the second external terminal extending to reach the at least one main surface defines the recess in cooperation with the solid electrolyte material.

7. The solid-state battery according to claim 1, further comprising an external terminal on a side surface of the solid-state battery laminate, the external terminal extending to reach the at least one main surface, and a thicknesses of the external terminal extending to reach the at least one main surface defining the step.

8. The solid-state battery according to claim 1, further comprising:
a first external terminal on a first side surface of the solid-state battery laminate, the first external terminal extending to reach the at least one main surface; and
a second external terminal on a second side surface of the solid-state battery laminate opposite the first side surface, the second external terminal extending to reach the at least one main surface, and wherein
a thickness of the first external terminal and the second external terminal extending to reach the at least one main surface defines the recess.

9. The solid-state battery according to claim 1, wherein a dimension of the step is 1% to 10% of a thickness of the overlapping part in the lamination direction.

10. The solid-state battery according to claim 2, wherein a dimension of the step is 1% to 10% of a thickness of the overlapping part in the lamination direction.

11. The solid-state battery according to claim 10, wherein the dimension of the step corresponds to a dimension of the solid electrolyte material defining the step.

12. The solid-state battery according to claim 1, wherein the solid-state battery is configured as a surface-mount product.

13. The solid-state battery according to claim 12, wherein the at least one main surface corresponds to a surface positioned on a mount surface side of the surface-mount product.

14. The solid-state battery according to claim 1, wherein the positive electrode layer and the negative electrode layer are layers configured to store and emit lithium ions.

* * * * *